United States Patent
Affan et al.

(10) Patent No.: US 11,641,984 B2
(45) Date of Patent: May 9, 2023

(54) COMMODITY DISPENSER SYSTEM WITH INVENTORY MONITOR AND USE-BASED REPLENISHMENT FEATURES

(71) Applicant: Henkel AG & Co. KGaA, Duesseldorf (DE)

(72) Inventors: Elif Affan, Stamford, CT (US); Glenn William Kaye, Norwalk, CT (US); Nicholas Robert Bull, Ridgefield, CT (US); Daniel Peter Sterling, Fairfield, CT (US); Mark A. Granja, Danbury, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 77 days.

(21) Appl. No.: 16/922,917

(22) Filed: Jul. 7, 2020

(65) Prior Publication Data

US 2022/0007898 A1  Jan. 13, 2022

(51) Int. Cl.
*A47K 5/12* (2006.01)
*G06Q 30/06* (2012.01)
*G06Q 30/0601* (2023.01)

(52) U.S. Cl.
CPC ....... *A47K 5/1217* (2013.01); *G06Q 30/0633* (2013.01)

(58) Field of Classification Search
CPC ...... A47K 5/1217; A47K 5/12; B67D 3/0006; B67D 3/0032; B67D 3/0035;
(Continued)

(56) References Cited

U.S. PATENT DOCUMENTS 3,880,329 A * 4/1975 Gardner, Jr. ......... B67D 1/0021
                                                        222/129.1
3,915,341 A * 10/1975 Brown ..................... A47J 31/54
                                                          222/67
(Continued)

FOREIGN PATENT DOCUMENTS

KR   1020120107355 A   10/2012
KR     101586080 B1    1/2016
(Continued)

OTHER PUBLICATIONS

One stealth startup, WePlenish, is already launching a line of "IoT-powered" smart containers that promise to revolutionize the modern kitchen. Read More. More Media Reviews. Play Video. Simple Setup. Connect to Wi-Fi. Connect the Smart Container to WiFi. Link a Consumable. Retrieved from https://weplenish.com on Jun. 8, 2020.
(Continued)

*Primary Examiner* — Donnell A Long
(74) *Attorney, Agent, or Firm* — Bojuan Deng (57) ABSTRACT

A commodity dispenser system includes a terminal dispenser device with a container configured to contain a commodity. The terminal dispenser device includes a user-controlled dispenser for selectively dispensing the commodity from the container. The terminal dispenser device includes a sensor and a communication device, and the sensor is configured to detect an inventory condition of the commodity within the container. The system further includes a server configured to communicate with the communication device of the terminal dispenser device, receive a communication corresponding to the inventory condition detected, and initiate an order for a replenishing shipment of the commodity to the dispenser device based, at least partly,
(Continued)

on the communication corresponding to the inventory condition detected.

20 Claims, 4 Drawing Sheets

(58) Field of Classification Search
 CPC .............. B67D 1/0078; G06Q 30/0633; B05B 11/0054; B65D 2583/005
 See application file for complete search history.

(56) References Cited

U.S. PATENT DOCUMENTS

| | | | |
|---|---|---|---|
| 6,688,134 B2 | 2/2004 | Barton | |
| 7,387,239 B2 | 6/2008 | Thomas | |
| 8,924,262 B2 | 12/2014 | Shuster | |
| 2002/0040585 A1* | 4/2002 | Chaney | B67D 3/0029 62/237 |
| 2004/0226962 A1* | 11/2004 | Mazursky | A47K 5/1217 222/95 |
| 2008/0210702 A1* | 9/2008 | Lochinger | A47K 5/1217 221/7 |
| 2009/0204256 A1* | 8/2009 | Wegelin | G01F 13/00 700/244 |
| 2011/0006078 A1* | 1/2011 | Hsu | B67D 3/0009 222/129 |
| 2017/0253473 A1* | 9/2017 | Melville, Jr. | B67D 1/0888 |
| 2017/0337458 A1* | 11/2017 | Ophardt | G06K 19/06037 |
| 2018/0049601 A1* | 2/2018 | Farahat | A47K 5/1217 |
| 2018/0086622 A1* | 3/2018 | Gallagher | B67D 3/0032 |
| 2020/0048066 A1* | 2/2020 | Breault | B67D 1/0079 |
| 2020/0062569 A1* | 2/2020 | Chang | B67D 1/0462 |
| 2020/0197966 A1* | 6/2020 | Marshall | A47K 5/1208 |
| 2021/0000289 A1* | 1/2021 | Kruger | A47J 31/407 |

FOREIGN PATENT DOCUMENTS

| | | |
|---|---|---|
| KR | 1020180055515 A | 5/2018 |
| WO | WO-2016141322 A1 * | 9/2016 |

OTHER PUBLICATIONS

International Search Report Application No. PCT/US2020/041292 Completed: Apr. 5, 2021 dated Apr. 6, 2021 11 Pages.

* cited by examiner

COMMODITY DISPENSER SYSTEM WITH INVENTORY MONITOR AND USE-BASED REPLENISHMENT FEATURES

FIELD OF THE INVENTION

The following relates to a commodity dispenser and, more particularly, relates to a commodity dispenser system with inventory monitor and use-based replenishment features.

BACKGROUND OF THE INVENTION

Subscription services exist for different commodities. In these systems, a user or household with a subscription automatically receives a fresh supply of the commodity at fixed time intervals. These subscription services exist for detergents, beverages, and other commodities.

However, commodity subscription services suffer from certain disadvantages. For example, the commodities are often shipped in large containers to provide cost savings. These containers may be bulky, heavy, difficult to handle, and/or difficult to dispense the commodity therefrom.

Furthermore, the terms of the subscription may cause the subscriber to receive the new supply of the commodity well before the existing inventory is depleted. In other words, the subscriber may not consume the commodity as fast as the fresh supplies are delivered. Accordingly, the subscriber may inadvertently build up a back supply of the commodity, which can be wasteful and inefficient. Conversely, the user may consume the commodity at a higher rate than anticipated and may run out of the commodity before a replenishing supply is received.

Thus, there is an ongoing need for a commodity distribution system, wherein the commodity containers are more compact, easier to handle, and more convenient to dispense from for the user. Furthermore, there is an ongoing need for a commodity distribution system that provides the convenience of subscription service, but that resupplies on a timelier basis. Furthermore, other desirable features and characteristics of the present disclosure will become apparent from the subsequent detailed description and the appended claims, taken in conjunction with the accompanying drawings and this background.

BRIEF SUMMARY OF THE INVENTION

Embodiments of an improved commodity dispenser are provided. In various embodiments, a dispenser device for dispensing a commodity includes a container configured to contain a commodity. The device also includes a user-controlled dispenser configured for selectively dispensing the commodity from the container. Furthermore, the device includes a sensor configured to detect an inventory condition of the commodity within the container. Moreover, the device includes a communication device configured to provide a communication corresponding to the detected inventory condition to a remote server to initiate an order for a replenishing shipment of the commodity to the dispenser device.

Additionally, an improved commodity dispenser system is disclosed that includes a terminal dispenser device with a container configured to contain a commodity. The terminal dispenser device includes a user-controlled dispenser for selectively dispensing the commodity from the container. The terminal dispenser device includes a sensor and a communication device, and the sensor is configured to detect an inventory condition of the commodity within the container. The system further includes a server configured to communicate with the communication device of the terminal dispenser device, receive a communication corresponding to the inventory condition detected, and initiate an order for a replenishing shipment of the commodity to the dispenser device based, at least partly, on the communication corresponding to the inventory condition detected.

Methods for distributing a commodity are also provided. In some embodiments, a method includes providing the commodity in a container of a terminal dispenser device. The terminal dispenser device includes a user-controlled dispenser for selectively dispensing the commodity from the container. The method also includes detecting, by a sensor of the terminal dispenser device, an inventory condition of the commodity within the container. Moreover, the method includes communicating, from a communication device of the terminal dispenser device to a server, a communication corresponding to the inventory condition detected. Furthermore, the method includes initiating, by the server, an order for a replenishment shipment of the commodity based, at least partly, on the communication corresponding to the inventory condition detected.

The foregoing statements are provided by way of non-limiting example only. Various additional examples, aspects, and other features of embodiments of the present disclosure are encompassed by the present disclosure and described in more detail below.

BRIEF DESCRIPTION OF THE DRAWINGS

At least one example of the present disclosure will hereinafter be described in conjunction with the following figures, wherein like numerals denote like elements, and.

For simplicity and clarity of illustration, descriptions and details of well-known features and techniques may be omitted to avoid unnecessarily obscuring the exemplary and non-limiting embodiments of the present disclosure described in the subsequent Detailed Description. It should further be understood that features or elements appearing in the accompanying figures are not necessarily drawn to scale unless otherwise stated.

DETAILED DESCRIPTION OF THE INVENTION

The following Detailed Description is merely exemplary in nature and is not intended to limit the present disclosure or the application and uses of the same. The term "exemplary," as appearing throughout this document, is synonymous with the term "example" and is utilized repeatedly below to emphasize that the following description provides only multiple non-limiting examples of the present disclosure and should not be construed to restrict the scope of the present disclosure, as set-out in the Claims, in any respect.

Furthermore, there is no intention to be bound by any theory presented in the preceding background or the following detailed description.

Broadly, embodiments of the present disclosure include a so-called "smart" dispenser device for a consumable product (i.e., a commodity). The device may include a user-controlled dispenser that selectively dispenses the commodity from the unit. The device may also include a sensor configured to detect an inventory condition of the commodity (e.g., the amount of commodity remaining in the container, the amount of use of the commodity since the container was last filled, etc.).

Also, the dispenser device can be incorporated in a system that provides more of the commodity (i.e., a replenishing supply of the commodity) according to the inventory condition detected by the sensor. In other words, the commodity may be replenished in an as-needed basis (i.e., based on actual use of the commodity). The dispenser device may communicate its self-detected inventory condition to a remote server. If the inventory condition satisfies a predetermined condition (one indicating that the inventory is low), then the server may initiate an order to send more of the commodity to the user.

There may be a plurality of dispenser devices that are incorporated within the system, and each may be enabled for self-monitoring its inventory. The server may communicate with each and individually order a replenishing shipment of the commodity. In some embodiments, at least one dispenser device may include a support structure and at least one container (reservoir, tank, volume, passage, etc.) that is supported by the support structure and that contains the commodity. The support structure may also support a nozzle, a pump, a valve, and/or other dispenser features for selectively dispensing the commodity from the container. In some embodiments, the support structure may also support the inventory sensor and a communication device for remote communication with the server.

Containers for the commodity may have various configurations in different embodiments of the present disclosure. In some embodiments, the container may comprise a refillable reservoir that is supported on the support structure and that may be periodically refilled to replenish the inventory. In other embodiments, the commodity can be contained in a removable and replaceable container, such as a bottle (e.g., a tub, single-use vessel, etc.). The replaceable container may be supported on the support structure but may be an independent vessel from the support structure that, when empty, can be replaced by a new container that is full of the commodity. Additionally, containers disclosed herein may include various features that make the container compact, lightweight, and ergonomic for improved storage as well as improved shipping and handling.

In some embodiments, the user can pour the commodity from a shipping container into the reservoir of the dispenser device, and the shipping container can be discarded, leaving the commodity to be selectively dispensed from the filled reservoir. The sensor may monitor the inventory of the commodity within the reservoir over time, and a processor of a control system can determine whether to order additional commodity for the user based on the detected inventory condition. Then, when a predetermined condition is met (e.g., the detected inventory reaches a predetermined minimum threshold), the system can initiate an order for a replenishing shipment of the commodity to the dispenser device. As a result, another container of the commodity is sent for refilling the reservoir.

In other embodiments, the container may be a removable and replaceable container that is supported by a support structure. The support structure may also include a dispenser for dispensing the commodity from the container. The sensor may detect the inventory condition of the commodity within the replaceable container. When the detected inventory satisfies the predetermined condition, the system can initiate the order for another replaceable container. Once received, the existing container may be removed from the support structure and replaced by the newly received container.

The system may also include one or more user interfaces with which to establish a subscription for the commodity, choose and alter settings, etc. Other data can be gathered and associated with the inventory monitoring data and utilized for various purposes. For example, user feedback may be gathered and saved in association with the particular commodity. Additionally, usage data, order information, and/or dosage data about the commodity may be saved in association with the tracked inventory conditions for a particular dispenser device.

This system may be used for any suitable commodity. In some embodiments, the commodity is a liquid (e.g., detergent, hair-care product, soap). In additional embodiments, the commodity may be a solid material (e.g., a particulate detergent). In other embodiments, the commodity may individually-packaged (e.g., unit dose packages of laundry detergent, scent booster, or automatic dishwashing detergent pouches).

Accordingly, the inventory monitoring system and its method of use may be very convenient for the user. Inventory of the commodity can be automatically replenished when the system detects that inventory is running low. Furthermore, the containers may be configured particularly for these systems. Accordingly, the refill containers may be lightweight, may include limited or reduced packaging, and may be compact for added convenience.

Figure 1:
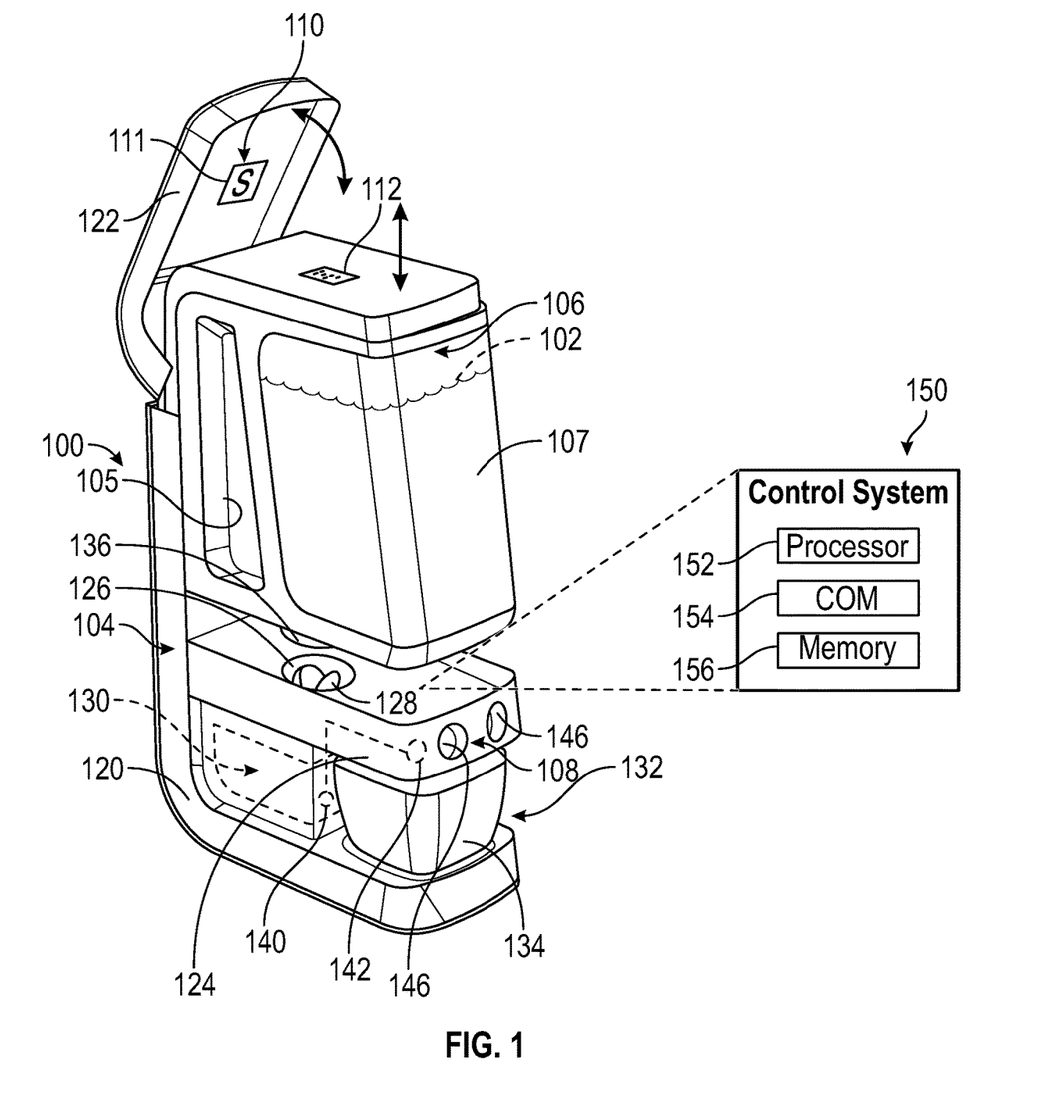
FIG. 1 is an isometric, exploded view of a dispenser device of a commodity dispenser system according to example embodiments of the present disclosure.

Referring now to FIG. 1, a dispenser device 100 for storing and selectively dispensing a commodity 102 is shown according to example embodiments. The dispenser device 100 may be configured for one of a variety of uses (e.g., home usage, office usage, etc.) and may be small and compact enough for countertop use, for storage in a closet, etc. The dispenser device 100 may be used with any suitable commodity, such as a liquid commodity. In some embodiments, for example, the dispenser device 100 may be used for conveniently and ergonomically dispensing liquid soap, detergent, shampoo, hair conditioner, fabric softener, and the like. However, it will be appreciated that the dispenser device 100 could be used for dispensing other commodities, including solids, individually packaged goods, edible and potable commodities, carbon dioxide or other gas, etc., without departing from the scope of the present disclosure. As will be discussed in detail, the dispenser device 100 may detect and self-monitor its inventory (i.e., detect an inventory condition) of the commodity 102 and communicate this information remotely such that the commodity 102 may be replenished on an as-needed basis. In other words, the commodity 102 may be replenished advantageously according to the usage and consumption of the commodity 102.

Figure 2:
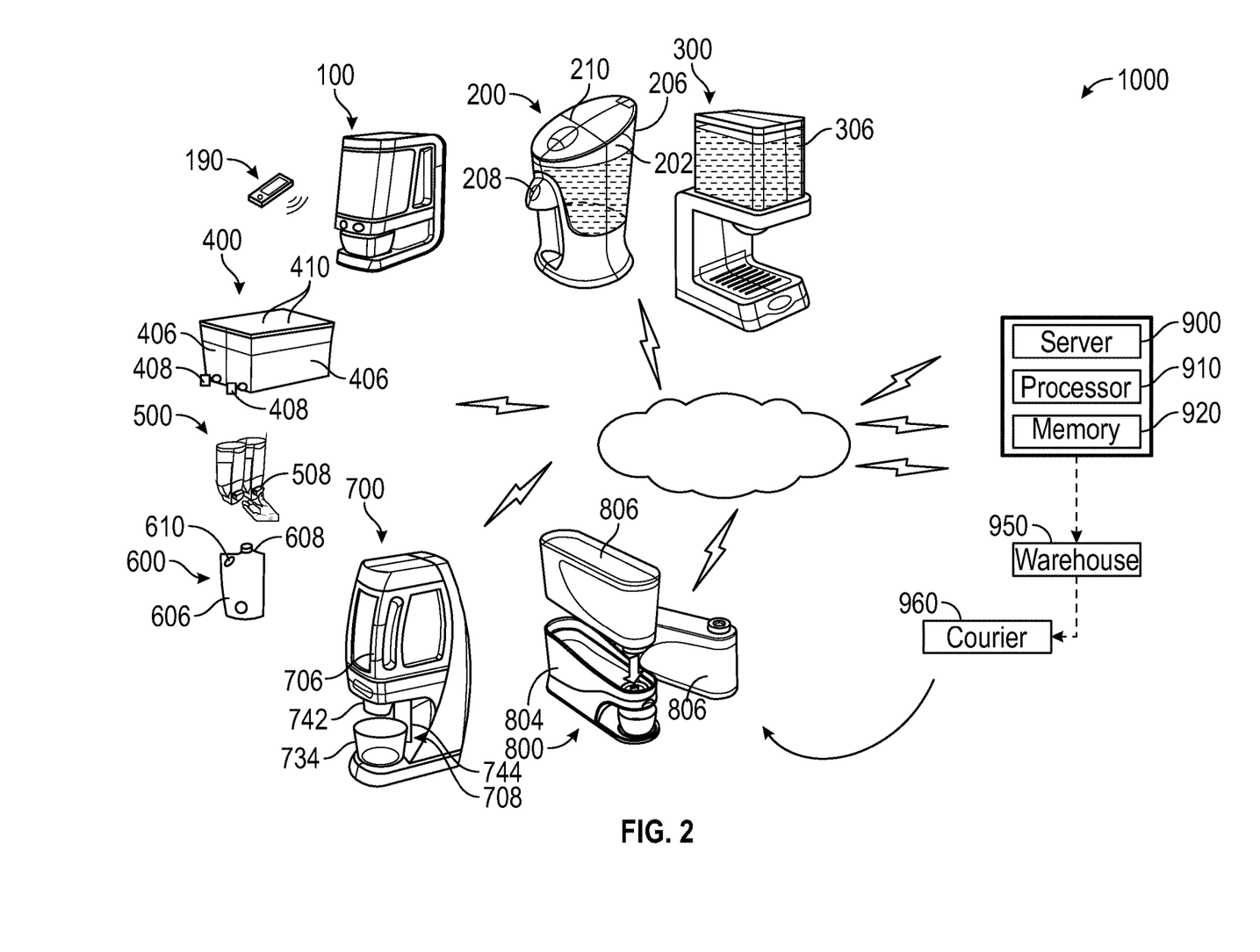
FIG. 2 is a schematic illustration of the commodity dispenser system of FIG. 1.

The dispenser device 100 may be part of a dispenser system 1000, which is illustrated in FIG. 2 according to example embodiments. The dispenser system 1000 may include a plurality of dispenser devices. In addition to the dispenser device 100 of FIG. 1 (a first dispenser device), the system 1000 may include a second dispenser device 200, a third dispenser device 300, a fourth dispenser device 400, a fifth dispenser device 500, a sixth dispenser device 600, a seventh dispenser device 700, and an eighth dispenser device 800. The dispenser devices 100-800 may be provided at different locales (e.g., in different households, different office buildings, etc.). The dispenser devices 100-800 may each store and selectively dispense a respective commodity. In some embodiments, the dispenser devices 100-800 may store/dispense the same commodity, the same commodity type, etc. In other embodiments, the dispenser devices 100-800 may store/dispense different commodities. As shown, the dispenser devices 100-800 may be differently shaped, differently configured, and/or may include different features that will be discussed in detail below. In other embodiments, the dispenser devices 100-800 may be configured substantially the same and may include the same features.

It will be appreciated that the dispenser system 1000 may include any number of dispenser devices without departing from the scope of the present disclosure. In addition, the dispenser devices 100-800 may detect and self-monitor its respective inventory and communicate this information remotely for replenishing its respective supply of commodity on an as-needed basis.

Referring back to FIG. 1, the dispenser device 100 may generally include a support structure 104, a container 106, and a user-controlled dispenser 108. The support structure 104 may support the container 106 and the dispenser 108. The container 106 may be partly defined by a replaceable container, such as a bottle 107, but there are other embodiments of the present disclosure that will be discussed below. Furthermore, as shown in FIG. 1, the dispenser 108 may be attached to and supported by the support structure 104; however, other embodiments fall within the scope of the present disclosure including embodiments in which the dispenser 108 is part of a container that is removably supported by the support structure.

The support structure 104 may be robust and strong for supporting other components of the device 100. The support structure 104 may include one or more ergonomic features for providing user convenience. In the embodiment of FIG. 1, for example, the support structure 104 may include a base 120 and a flip-top 122 that is pivotably attached to the base 120. The support structure 104 may further include a support platform 124, which is relatively flat. The support platform 124 may further include a recessed port 126 with an opener 128 disposed proximate thereto. The opener 128 may include one or more sharpened projections that are used for opening containers of the commodity as will be described in detail below. The recessed port 126 may be included on a top surface of the support platform 124. The port 126 may be in fluid communication with a refillable reservoir 130 defined internally within the support structure 104 below the support platform 124 and below the port 126. The support structure 104 may also define a space 132 below the support platform 124 and the lower area of the base 120 that accommodates a removable dispenser cup 134 or other vessel that receives the commodity 102 from the dispenser 108.

As stated, the container 106 may include and/or be partly defined by the bottle 107. The bottle 107 may be removably supported on the support platform 124 with the port 126 receiving the spout 136. The bottle 107 may be removeable and replaceable by another full bottle when the first is empty. However, in other embodiments, the bottle 107 or other element of the container 106 may be a fixed, refillable container that remains attached to the support structure 104 and that may be periodically filled with the commodity 102.

As shown in FIG. 1, the bottle 107 may have a substantially rectangular, cuboid shape. The bottle 107 may be a thin-walled and hollow container. In some embodiments, the bottle 107 may be a blow-molded container that is made of recyclable plastic. The bottle 107 may be highly compact, stackable with others on a pallet, and, thus, configured for shipping and handling efficiency. The bottle 107 may be well-suited for e-commerce distribution.

The bottle 107 may include one or more handles and/or, as shown in FIG. 1, one or more handling recesses 105, which may be grasped for holding the bottle 107. The bottle 107 may also include a spout 136. The spout 136 may be a cylindrical projection extending from the bottom of the bottle 107 and may include a rounded opening that provides access to the interior of the bottle 107. The spout 136 may include one or more closures, such as a cap, a removable seal, etc. that closes off the spout 136 and that can be selectively opened to allow the commodity 102 to move out of the bottle 107. More specifically, in some embodiments, the spout 136 may be a threaded neck of the bottle 107 with a removable cap as well as a paper or plastic seal that can be peeled away, punctured, etc. to open the spout 136.

To reinforce consumer brand-connection and provide production directions & safety info, a peel-off cling sticker may be included on the bottle 107. The sticker may be peeled off and stuck onto the front of the support structure 104 for easy access and visibility. The label will contain the branding, variant name, basic dosing information, QR code, product detail, safety information, etc.

The bottle 107 may be removably supported on the support structure 104. The bottle 107 and the support structure 104 may have corresponding shapes, corresponding features, etc. such that the bottle 107 nests upon or otherwise engages the support structure 104. For example, the bottle 107 may include a rectangular bottom that is received and that seats upon the rectangular support platform 124. The support platform 124 may include one or more concavely contoured side surfaces that receive corresponding convex side surfaces of the bottom of the bottle 107 to thereby provide nesting engagement and support. The back side of the bottle 107 may also include recessed edges that receive corresponding side rails of the base 120. Furthermore, the flip-top 122 may flip down over and engage the top side of the refill container 106. Once positioned on the support structure 104, the front and sides of the bottle 107 may remain exposed from the support structure 104. Also, surfaces of the support structure 104 may lie substantially flush (i.e., substantially within the same plane) with surfaces of the bottle 107.

Additionally, the spout 136 may be shaped according to the port 126 of the support structure 104 for engaging the two features. For example, the spout 136 may be a rounded, tubular projection, and the port 126 may be a correspondingly rounded, tubular recess configured to receive the spout 136. Furthermore, the opener 128 may be configured for opening the closure on the spout 136 as the bottle 107 is placed upon the support structure 104. More specifically, the spout 136 may include a thin, plastic or paper seal closure, and the opener 128 may pierce through this closure as the bottle 107 is placed upon the support structure 104. This action opens the bottle 107 and allows the commodity 102 therein to flow through the port 126 and into the reservoir 130. Accordingly, in some embodiments, the commodity 102 may flow from the bottle 107 and into the reservoir 130 under the force of gravity. In additional embodiments, the dispenser device 100 may include a pump that pumps the commodity 102 from the bottle 107 to the reservoir 130. Thus, the commodity 102 may be initially provided in the bottle 107 and may flow to the fluidly connected reservoir 130. In some embodiments, the commodity 102 may be simultaneously provided in both the bottle 107 and the reservoir 130. As the commodity 102 is used and dispensed from the device 100, the commodity 102 may drain from the bottle 107 and then eventually empty from the reservoir 130. Thus, in these embodiments, the interior of the bottle 107 and the reservoir 130 (and any plumbing, tubing, valves, etc. leading from the reservoir 130 to a nozzle 142 of the dispenser 108) may collectively define the container 106 that contains the commodity 102. It will be appreciated, however, that the container 106 may be configured differently without departing from the scope of the present disclosure.

The dispenser 108 of the device 100 may be configured for selectively dispensing the commodity 102 from the container 106 into the dispenser cup 134. The dispenser 108 may have an ON position or configuration in which the commodity 102 flows from the dispenser 108 and an OFF position or configuration in which the flow of the commodity 102 is stopped. As mentioned, the dispenser 108 may include the nozzle 142. The nozzle 142 may positioned on the underside of the support platform 124 for directing, squirting, or otherwise providing the commodity 102 into the dispenser cup 134.

In some embodiments, the dispenser 108 may include a pump 140, which pumps the commodity 102 from the reservoir 130 to the nozzle 142. The pump 140 may be of any suitable type (e.g., an electric pump, a peristaltic pump, a manual pump, etc.) for moving the commodity 102 from the reservoir 130 toward the nozzle 142. Additionally, in some embodiments, the nozzle 142 and/or other features of the dispenser 108 may include a valve that can be selectively opened (to dispense the commodity 102) and closed (to cut off the flow of the commodity 102). It will be appreciated, however, that the dispenser 108 may be configured differently without departing from the scope of the present disclosure. For example, in some embodiments, the dispenser 108 may include a gravity-fed valve that, when open, allows the commodity 102 to flow from the nozzle 142 solely under the force of gravity and that cuts off flow of the commodity 102 when closed. Also, in some embodiments, the dispenser 108 may include a mechanical device, such as a manual pump, or an internal arm that squeezes the side wall of the bottle 107 to force a dose (a predetermined amount) of the commodity 102 out of the nozzle 142.

The dispenser 108 may also, in some embodiments, include a user interface 144. The user interface 144 may, in some embodiments, include one or more user controls, such as buttons, levers, dials, slider knobs, pull-out knobs, squeezable paddles, touch-sensitive surfaces, etc. that the user can manipulate for selectively dispensing the commodity 102, for adjusting settings of the dispenser device 100, and/or for otherwise providing user input. The user controls of the user interface 144 may include one or more of a variety of mechanical devices, electronics, etc. In some embodiments, the user interface 144 may include input devices and may also include one or more output devices (e.g., display screens, lighting, audio speakers, etc.) for outputting information to the user. As shown in FIG. 1, the user controls and input devices of the user interface 144 may include a plurality of buttons 146 (e.g., two buttons). At least one button 146 can be depressed to cause the commodity 102 to be dispensed from the nozzle 142. The buttons 146 may be disposed on the front side of the support platform 124. The buttons 146 may also include associated lights that illuminate, flash, change color, or otherwise visually output information. The dispenser 108 may have different dispensing settings, and the different buttons 146 may represent the different settings. In some embodiments, each button 146 may represent a different dosage setting. Accordingly, if a user presses one of the buttons 146, a first amount (a first dose) of the commodity 102 may be dispensed, and if the other button 146 is pushed, then a second amount (a second dose) of the commodity 102 may be dispensed. The buttons 146 may also have different associated functionality without departing from the scope of the present disclosure. Also, there may be any number of buttons 146 without departing from the scope of the present disclosure.

Figure 5:
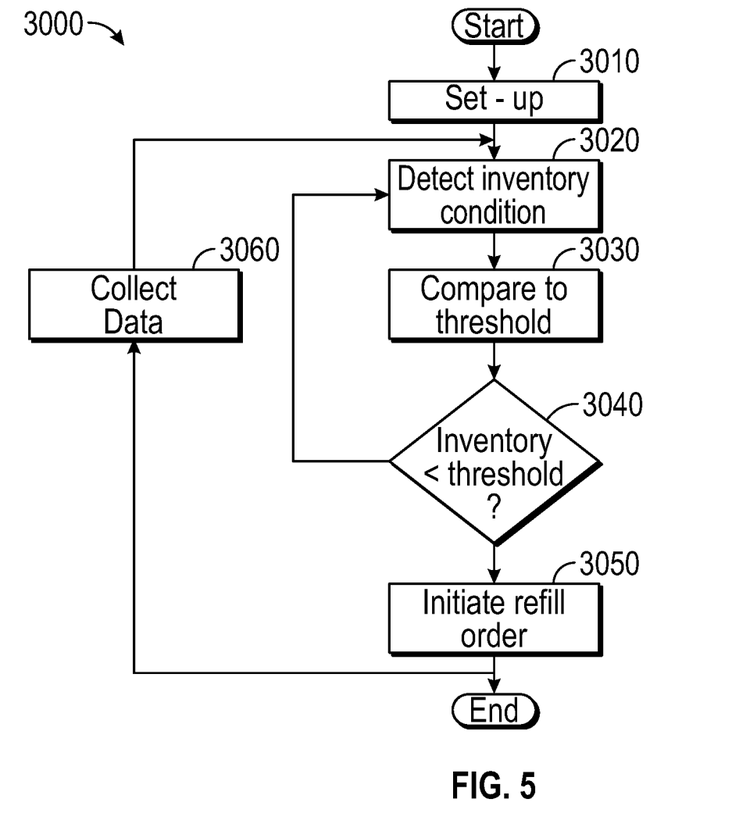
FIG. 5 is a flow chart illustrating a method of operating the dispenser device of FIG. 1 and the commodity dispenser system of FIG. 2 according to example embodiments.

Moreover, the device 100 may include a control system 150. The control system 150 may be a computerized device with a processor 152. The control system 150 may control the pump 140, the user interface 144, the dispenser 108, and/or other features of the device 100. The control system 150 may include one or more modules for such controls. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The control system 150 may supply control signals to various components of the device 100 and/or to components of the system 1000 represented in FIG. 2. The control system 150 may also employ various methods of operating the device 100 and/or system 1000. FIG. 5 represents a method of operating the system 1000 that will be discussed below according to example embodiments.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the dispenser device control system described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The control system 150 may also include a communication device 154. The communication device 154 may be a wireless transceiver providing two-way remote communication with a server 900 (FIG. 2). Also, in some embodiments, the communication device 154 may establish communication with the server 900 via a wireless internet router within the home, office, etc. In some embodiments, the communication device 154 may create a proprietary WIFI network and/or connect to a user network so as to be part of the so-called "internet of things."

The device 100 may also include at least one sensor 110. The sensor 110 may be configured to detect an inventory condition of the commodity 102 within the container 106. The term "inventory condition" will be interpreted broadly to mean a condition that is related to the supply of commodity 102 within the container 106, the amount of commodity 102 available for dispensing from the device 100, the amount of use of the commodity 102 during a particular period, etc. In other words, the sensor 110 may be used to monitor the inventory of the commodity 102. In some embodiments, the sensor 110 may be configured for monitoring the actual amount of commodity 102 within the container 106. Furthermore, in some embodiments, the sensor 110 may be configured for detecting how much usage has occurred such that the remaining amount of commodity 102 in the container 106 may be determined.

The sensor 110 may be supported by the support structure 104. For example, at least one element of the sensor 110 may be directly attached to the support structure 104. Also, in some embodiments, the sensor 110 may include one or more devices that are attached to the bottle 107 so as to be supported by the support structure 104 when the bottle 107 is disposed thereon. Furthermore, as shown in FIG. 1, the sensor 110 may include a first element 111 that is attached to the support structure 104 and a second element 112 that is attached to the bottle 107, and the first and second elements 111, 112 may interact so as to detect the inventory condition of the commodity 102. In some embodiments, the first element 111 may be an electronic element that is hard-wired to the control system 150 and the second element 112 may be a label, sticker, magnet, dipstick, or other element that interacts with the first element 111 for detecting the inventory condition.

The sensor 110 may detect the inventory condition in a variety of ways without departing from the scope of the present disclosure. In some embodiments, the sensor 110 may include one or more mechanical elements. In additional embodiments, the sensor 110 may include one or more electrical devices (e.g., electrical sensors that capacitively or resistively make electrical measurements).

For example, the sensor 110 may include and/or incorporate a scale, one or more load cells, a spring-loaded limit switch, or other device configured to measure weight and/or weigh the commodity 102 within the container 106 (i.e., within the bottle 107 and/or the reservoir 130). The sensor 110 and/or one or more processors of the control system 150 may track the reduction in weight of the commodity 102 as it is dispensed and used over time.

In additional embodiments, the sensor 110 may include a usage sensor configured to detect a usage amount of the commodity 102 dispensed from the container 106 (i.e., the amount dispensed from the nozzle 142). In these embodiments, the sensor 110 may be a flow sensor. The sensor 110 and/or one or more processors of the control system 1560 may detect how much of the commodity 102 has been dispensed over time (e.g., since the bottle 107 was full of the commodity 102).

Also, the sensor 110 may be operably connected to the user interface 144 of the dispenser 108. For example, in some embodiments, the sensor 110 may be operably connected to the user controls. Specifically, the sensor 110 may detect how many times the button(s) 146 have been pressed to monitor usage and to determine the inventory condition of the commodity 102. Those having ordinary skill in the art will appreciate that the sensor 110 may be operably connected to other user controls or other interfaces 144 (levers, sliders, knobs, etc.) of other embodiments as well.

In further embodiments, the sensor 110 may include a contents sensor configured to detect an actual amount of the commodity 102 that is available within the container 106 (i.e., within the bottle 107 and/or within the reservoir 130). For example, the sensor 110 may be a volume sensor that detects the volume of the commodity 102 within the container 106, a level sensor that detects the level of the top surface of the commodity 102, etc. In these embodiments, the sensor 110 may be an optical sensor system that directs an optical input (e.g., a laser) to the surface of the commodity 102 within the container 106 and that detects the resulting optical signal (e.g., the reflected laser signal). So-called "time-of-flight" measurements may be taken. The signal may change as a function as the surface level of the commodity 102 lowers within the container 106 and the sensor 110 may detect this change for determining the inventory condition (i.e., the level of commodity 102 within the container 106). Ultrasound, radar, or other signals may be used in some embodiments as well.

In additional embodiments, the sensor 110 may include a dipstick, float, or other similar implement that is coupled to the reservoir 130, the bottle 107, or other area of the container 106. The sensor 110 may be a dipstick that is immersed and exposed to the commodity 102, and the amount of surface area of the dipstick exposed to the commodity 102 may change as the amount of commodity 102 lowers within the container. The sensor 110 may detect this change for determining the inventory condition (i.e., the amount of commodity 102 remaining within the container 106). The sensor 110 may also be a float within the reservoir 130, the bottle 107, or other area of the container 106. Once the amount of the commodity 102 falls to a predetermined level, the sensor 110 may provide a corresponding signal to the processor 152.

The processor 152 of the control system 150 may be in communication with the sensor 110 and may receive a signal corresponding to the inventory condition detected by the sensor 110. In some embodiments, the processor 152 may include one or more modules that determine whether the inventory condition meets a predetermined inventory condition. If the condition is met, then the processor 152 may determine that replenishment of the commodity 102 is necessary.

Figure 4:
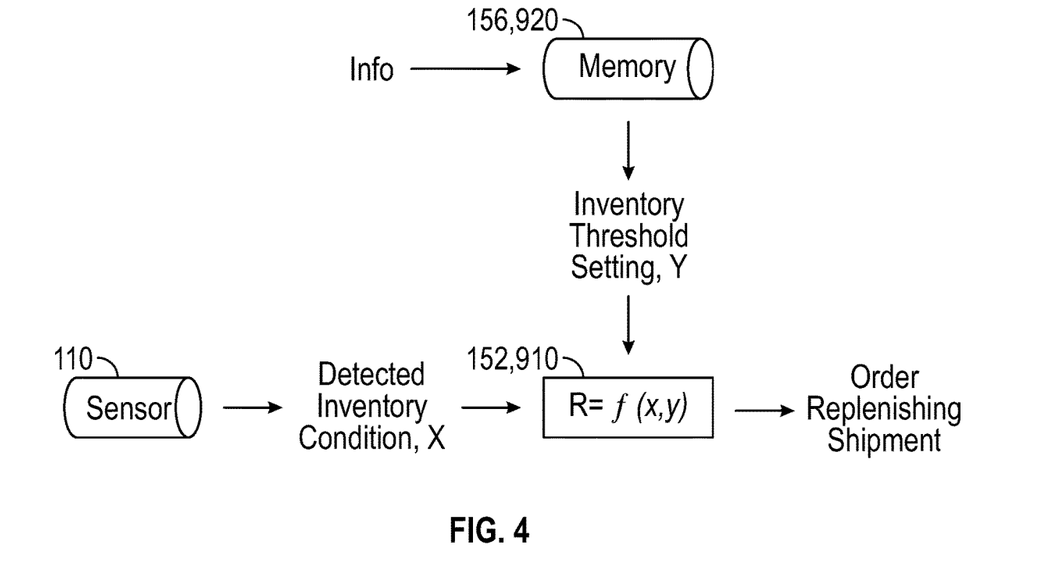
FIG. 4 is a dataflow diagram for operating the commodity dispenser system of FIG. 2.

In some embodiments, the device 100 may include a computerized memory device 156 that stores data related to the inventory condition. In some embodiments, the memory device 156 may store the remaining amount of commodity 102, the amount of usage of the commodity 102 detected by the sensor 110, etc. Furthermore, in some embodiments, the memory device 156 may store a threshold, such as a stored minimum amount of commodity 102. The memory device 156 may supply the processor 152 with this threshold, and the sensor 110 may supply the processor 152 with the detected (i.e., actual) inventory condition (e.g., the amount of the commodity 102), and the detected condition may be compared with the threshold. The comparison may determine whether the predetermined condition is met as represented in FIG. 4.

As shown in FIG. 2, the server 900 may also respectively include or have access to a processor 910 and a computerized memory device 920. In some embodiments, the processor 910 and memory device 920 (FIG. 2) may be included instead of the processor 152 and memory device 156 of the dispensing device 100 (FIG. 1), and the processor 910 may determine whether the replenishment is needed (FIG. 4). In additional embodiments, the system 1000 may include both the processor 910 at the server 900 and the processor 152 at the dispenser device 100, and both may make independent and/or redundant determinations. Likewise, the system 1000 may include both the memory device 920 at the server 900 and the memory device 156 at the dispensing device 100 for storing data in memory. Furthermore, it will be appreciated that the system 1000 may rely on cloud computing for operations in some embodiments as well.

Figure 3:
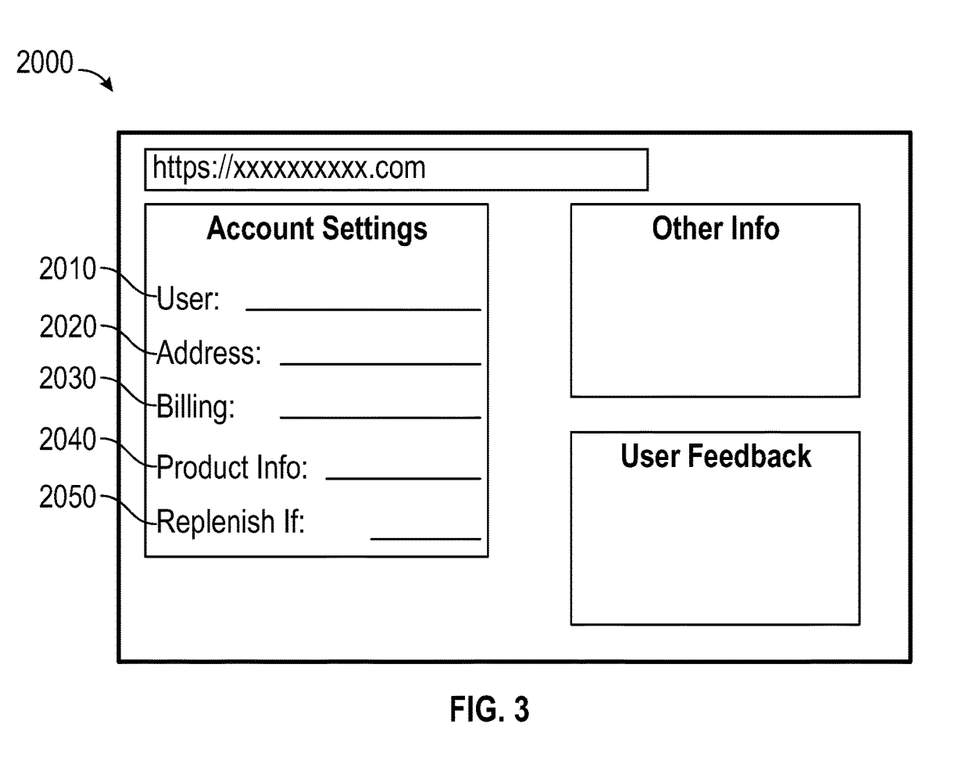
FIG. 3 is a schematic illustration of an internet-based user interface for the dispenser device of FIG. 1.

Referring now to FIG. 5, the method 3000 of operating the dispensing device 100 and the system 1000 will be discussed in greater detail. The method 3000 may begin at 3010, which may include setting up the device 100, configuring the device 100, etc. For example, at 3010, a new and full bottle 107 may be placed atop the support structure 104 as discussed above. Also, user inputs may be provided, operational parameters and settings may be input and adjusted, and more. In some embodiments, the user may provide inputs via the user interface 144 on the device 100. Furthermore, in some embodiments represented in FIG. 2, the dispensing device 100 may be used and/or controlled with a separate computerized device 190 (FIG. 2). The device 190 may be a mobile device (phone, tablet, smartwatch, etc.), laptop or desktop computer, etc. The device 190 may access an internet webpage 2000 as represented in FIG. 3. The internet webpage 2000 may be part of an online user interface and may comprise features and/or operably connect with the user interface 144 of the dispenser device 100.

Thus, at 3010 of the method 3000 (FIG. 5), the webpage 2000 may be used to enter account settings for the user of the dispenser device 100. The account settings may include the username 2010, the user's address 2020 where the dispenser device 100 is used, credit card or other billing information 2030, product information 2040 for the dispenser device 100 (e.g., model number, the size of bottle 107, the brand of commodity to supply, etc.). Setup may also include user entry of one or more replenishment condition parameters 2050. For example, the parameter 2050 may represent a minimum level of the commodity 102 within the container 106. The parameter 2050 may represent a maximum usage of the dispenser 108. This parameter 2050 may be a user-controlled setting for adjusting the delivery schedule of the commodity 102 for re-stock. As one example, a user may choose to initiate the shipment of replacement commodity 102 when the sensor 110 detects that the amount of commodity 102 is below one quarter of the capacity of the container 106. The user may choose to alter this setting and request shipment when the amount of commodity 102 detected by the sensor 110 falls below one eighth of capacity. Other settings may also be available. These settings may be stored in the memory device 920 for centralized storage.

Furthermore, in some embodiments, additional information may be collected, for example, via the webpage 2000. As shown in FIG. 3, a user may input various feedback, such as customer satisfaction, survey information, information about the dosages of the commodity 102, etc.

Once the device 100 is setup and the container 106 is full (i.e., the bottle 107 is in place), the commodity 102 may be selectively dispensed by the dispenser 108. The inventory of the commodity 102 may be tracked over time by the sensor at 3020 of the method 3000. The method 3000 may continue at 3020, wherein the sensor 110 detects the inventory condition of the commodity 102. As discussed above, the sensor 110 may detect (e.g., substantially continuously monitor) the level of commodity 102 within the container 106. The sensor 110 may, alternatively, detect actual usage of the commodity 102, measure how much has been used, or otherwise detect the inventory condition of the commodity 102.

The method 3000 may continue at 3030, wherein the inventory condition detected at 3020 is compared with a threshold inventory condition. For example, the threshold inventory condition may be one or more parameters previously set by the user at 3010 of the method 3000. More specifically, the threshold may be a parameter (Y) that is one or more of the replenishment condition parameters 2050 (FIG. 3) previously set. The parameter (Y) may be a minimum level (minimum amount) of commodity 102 for the container 106, and the actual level of the commodity 102 detected by the sensor 110 at 3020 may be compared at 3030 of the method 3000. The parameter (Y) may be a maximum amount of use of the commodity 102, and the actual use of the commodity 102 detected by the sensor 110 at 3020 may be compared at 3030 of the method 3000.

As shown in embodiments represented in FIG. 4, for example, the processor 152 (or processor 910) may determine whether the detected amount of the commodity 102 (X) detected by the sensor 110 is below the predetermined threshold amount (Y). If the detected amount is more than the threshold (X>Y), then 3040 is answered negatively, the condition is not met, and the method 3000 may loop back to 3020 for more monitoring of the inventory condition. If the detected amount is less than the threshold (X<Y), then 3040 is answered positively, the condition is met, and the method 3000 may continue to 3050.

At 3050, the processor 152, 910 may output a signal that initiates a replenishment sequence as represented in FIG. 4. As a result, a fresh supply (e.g., at least one new bottle 107) may be shipped to replenish the supply of the commodity 102 for the device 100. For example, the server 900 may communicate an order to a warehouse 950 and/or a courier 960 to provide a full, new, fresh, inventory-replenishing bottle 107 to the dispenser device 100.

Accordingly, the inventory of the commodity 102 may be replenished per the detected usage of the commodity 102. Once empty, the old bottle 107 may be removed from the support structure 104 and recycled, and the full bottle 107 may be placed atop the support structure 104 as discussed above. It will be appreciated that the system 1000 may be configured for delivering the commodity 102 on a just-in-time basis such that there is unlikely to be a stockpile of bottles 107 in inventory. Instead, the bottle 107 is more likely to be empty or near-empty when the replenishing bottle 107 is delivered.

Furthermore, the method 3000 may continue at 3060, wherein additional data is collected, for example, by the sensor 110 of the device 100. The sensor 110 may be used to automatically detect an identifier of the commodity (e.g., a name brand, a version, a vintage, sourcing information about the producer, etc.). For example, this information may be included on a label or on a surface of the bottle 107 and the sensor 110 may detect this information. The device 100 may also record a time that the inventory condition was detected at 3020, a quantity of the commodity 102 dispensed, or other information and may communicate this information for storage on the memory device 920. The control system 150 may send this information to the memory device 920 and associate this additional information with the order placed at 3050.

As such, data can be analyzed, combined, and investigated for benefitting the customer, the commodity producer, the warehouse 950, the courier 960, and/or other parties within the system 1000. The processor 910 may be used to process this data and determine a user's historical trends for usage of the commodity 102, the average usage of the commodity 102, and more. This information may indicate and predict future usage of the commodity 102. The user may also track their own usage, trends, etc. Customer feedback may also be associated with the data gathered by the sensor 110. In some embodiments, the server 900 may communicate information back to the device 100 based on this information. For example, the processor 910 may suggest a dosage based on historical usage information saved in the memory device 920.

The method 3000 may be employed for the other devices 200-800 within the system 1000 as well. As shown in FIG. 2, the other devices 200-800 may include a number of additional features that will be discussed.

The second dispenser device 200 may be substantially similar to the first dispenser device 100 except as noted. Components that correspond to those of FIG. 1 are indicated with corresponding reference numbers increased by 100. The second dispenser device 200 may have a generally rounded shape. The top of the device 200 may be slanted. The container 206 may be a refillable container, and the sensor 210 may track the volume of the commodity 202 as it is used. The dispenser 208 may include a single button for dispensing the commodity 202.

The third dispenser device 300 may be substantially similar to the first dispenser device 100 except as noted. Components that correspond to those of FIG. 1 are indicated with corresponding reference numbers increased by 200. The third dispenser device 300 may be generally rectangular in shape. The container 306 may be a refillable container.

The fourth dispenser device 400 may be substantially similar to the first dispenser device 100 except as noted. Components that correspond to those of FIG. 1 are indicated with corresponding reference numbers increased by 300. The fourth dispenser device 400 may include a plurality of containers 406, a corresponding plurality of dispensers 408, and a corresponding plurality of sensors 410. In some embodiments, the fourth dispenser device 400 may include two containers 406, dispensers 408, and sensors 410. Accordingly, two different commodities 402 (e.g., shampoo and conditioner, laundry soap and fabric conditioner, or other combinations) may be stored and dispensed from the fourth dispenser device 400.

The fifth dispenser device 500 may be substantially similar to the first dispenser device 100 except as noted. Components that correspond to those of FIG. 1 are indicated with corresponding reference numbers increased by 400. Also, the fifth dispenser device 500 may be substantially similar to the fourth dispenser device 400. However, while the dispensers 408 of the fourth dispenser device 400 may be gravity-fed and may include an ON/OFF valve, the dispensers 508 of the fifth dispenser device 500 may include manual pumps.

The sixth dispenser device 600 may be substantially similar to the first dispenser device 100 except as noted. Components that correspond to those of FIG. 1 are indicated with corresponding reference numbers increased by 500. The sixth dispenser device 600 may include a bag-like container 606. The container 606 may have flexible walls. The dispenser 608 may be used to squeeze the container 606 for dispensing the commodity. The sensor 610 may track the inventory of the container 606.

The seventh dispenser device 700 may be substantially similar to the first dispenser device 100 except as noted. Components that correspond to those of FIG. 1 are indicated with corresponding reference numbers increased by 600.

The seventh dispenser device 700 may be compact and upright. The seventh dispenser device 700 may include a replaceable container 706. The user controls of the dispenser 708 may include a flat, plate-like lever that can be manually actuated by the dispenser cup 734. In some embodiments, the lever may be disposed behind the nozzle 742 and relatively positioned (i.e., spaced apart) such that the dispenser cup 734 may be pushed against the lever while being positioned below the nozzle 742 for receiving the commodity from the nozzle 742. The dispenser cup 734 may be moved away from the lever to cut off flow of the commodity. Accordingly, the seventh dispenser device 700 may provide ergonomic dispensing as well as the inventory monitoring capabilities described herein. These features may be configured differently, for example, with another pusher-type, puller-type, sliding, or other user interface 744 and/or with another dispensing opening (other than the nozzle 742). Additionally, these features may be configured differently, for example, with another type of dispenser cup 734.

In some embodiments, the lever may be disposed behind the nozzle 742 such that the dispenser cup 734 may be pushed against the lever while being positioned below the nozzle 742 for receiving the commodity from the nozzle 742.

The eighth dispenser device 800 may be substantially similar to the first dispenser device 100 except as noted. Components that correspond to those of FIG. 1 are indicated with corresponding reference numbers increased by 700. The container 806 may be replaceable on the support structure 804. A replacement container 806 is also shown. The container 806 may be elongate and may be supported atop the support structure 804.

In these embodiments, the inventory for the dispenser devices 100-800 may be monitored. The commodities may be shipped according to the detected usage as discussed above for increased convenience and efficiencies.

Terms such as "first" and "second" have been utilized above to describe similar features or characteristics in view of the order of introduction during the course of description. In other sections of this Application, such terms can be varied, as appropriate, to reflect a different order of introduction. While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the present disclosure. It is understood that various changes may be made in the function and arrangement of elements described in an exemplary embodiment without departing from the scope of the invention as set forth in the appended claims.

What is claimed is:

1. A dispenser device for dispensing a commodity comprising:
   a container configured to contain a commodity;
   a user-controlled dispenser configured for selectively dispensing the commodity from the container; and
   a sensor configured to detect an inventory condition of the commodity within the container and additional use data related to the inventory condition; and
   a communication device configured to provide a communication corresponding to the detected inventory condition, the communication including the additional use data to a remote server to initiate an order for a replenishing shipment of the commodity to the dispenser device.

2. The dispenser device of claim 1, further comprising a support structure that supports the container;
wherein the container is removably supported by the support structure.

3. The dispenser device of claim 2, wherein the sensor is attached to the support structure.

4. The dispenser device of claim 1, wherein the dispenser includes a gravity-feed portion for selectively dispensing the commodity from the container.

5. The dispenser device of claim 1, further comprising a pump configured to pump the commodity from the dispenser for selectively dispensing the commodity from the container.

6. The dispenser device of claim 1, wherein the sensor includes a scale configured to weigh the commodity in the container.

7. The dispenser device of claim 1, wherein the sensor includes a usage sensor configured to detect a usage amount of the commodity dispensed from the container from which an amount of the commodity in the container is determined.

8. The dispenser device of claim 1, wherein the sensor includes a level sensor configured to detect a level of available commodity within the container.

9. The dispenser device of claim 1, further comprising a dispenser cup;
wherein the dispenser includes a dispensing opening from which the commodity is dispensed; and
wherein the dispensing opening and the user-controlled dispenser are relatively positioned such that the commodity is dispensed from the dispensing opening into the dispenser cup when the dispenser cup actuates the user-controlled dispenser.

10. A commodity dispenser system comprising:
a terminal dispenser device with a container configured to contain a commodity, the terminal dispenser device including a user-controlled dispenser for selectively dispensing the commodity from the container, the terminal dispenser device including a sensor and a communication device, the sensor configured to detect an inventory condition of the commodity within the container and additional use data related to the inventory condition; and
a server configured to communicate with the communication device of the terminal dispenser device, receive a communication corresponding to the inventory condition detected, the communication including the additional use data, and initiate an order for a replenishing shipment of the commodity to the dispenser device based, at least partly, on the communication corresponding to the inventory condition detected.

11. The dispenser system of claim 10, wherein the terminal dispenser device includes a support structure that supports the container; and
wherein the container is removably supported by the support structure.

12. The dispenser system of claim 11, further comprising a replacement container of the replenishing shipment, the replacement container being removably supported by the support structure for replacing the removable container.

13. The dispenser system of claim 10, further comprising a computerized memory device with a stored inventory threshold condition; and
further comprising a processor configured to compare the detected inventory condition and the stored inventory threshold condition to determine if a predetermined condition is met; and
wherein the order is initiated when the predetermined condition is met.

14. The dispenser system of claim 13, wherein the processor is configured to associate, in the computerized memory device, the additional use data associated with the order.

15. The dispenser system of claim 14, wherein the additional use data is chosen from a group of time that the inventory condition was detected, an identifier of the commodity, a quantity of the commodity dispensed, or a combination thereof.

16. The dispenser system of claim 10, wherein the terminal dispenser device includes a support structure that supports the container;
wherein the container includes a refillable reservoir defined in the support structure; and
further comprising a disposable vessel of the replenishing shipment, the disposable vessel containing the commodity for refilling to the refillable reservoir.

17. A method of distributing a commodity comprising:
providing the commodity in a container of a terminal dispenser device, the terminal dispenser device including a user-controlled dispenser for selectively dispensing the commodity from the container;
detecting, by a sensor of the terminal dispenser device, an inventory condition of the commodity within the container and additional use data related to the inventory condition;
communicating, from a communication device of the terminal dispenser device to a server, a communication corresponding to the inventory condition detected, the communication including the additional use data; and
initiating, by the server, an order for a replenishment shipment of the commodity based, at least partly, on the communication corresponding to the inventory condition detected.

18. The method of claim 17, wherein the container is at least partly defined by a removable container; and
wherein initiating the order includes ordering the replenishment shipment of another removable container of the commodity, the removable container being replaceable by the other removable container.

19. The method of claim 17, further comprising storing, in a computerized memory device, the detected inventory condition and the additional use data that is associated with the detected inventory condition.

20. The method of claim 19, wherein the additional use data is chosen from a group of time that the inventory condition was detected, an identifier of the commodity, a quantity of the commodity dispensed, or a combination thereof.

* * * * *